Sept. 29, 1942.  H. SCHÜLER  2,297,254
TYPEWRITER AND LIKE MACHINE
Filed Aug. 23, 1938  5 Sheets-Sheet 1
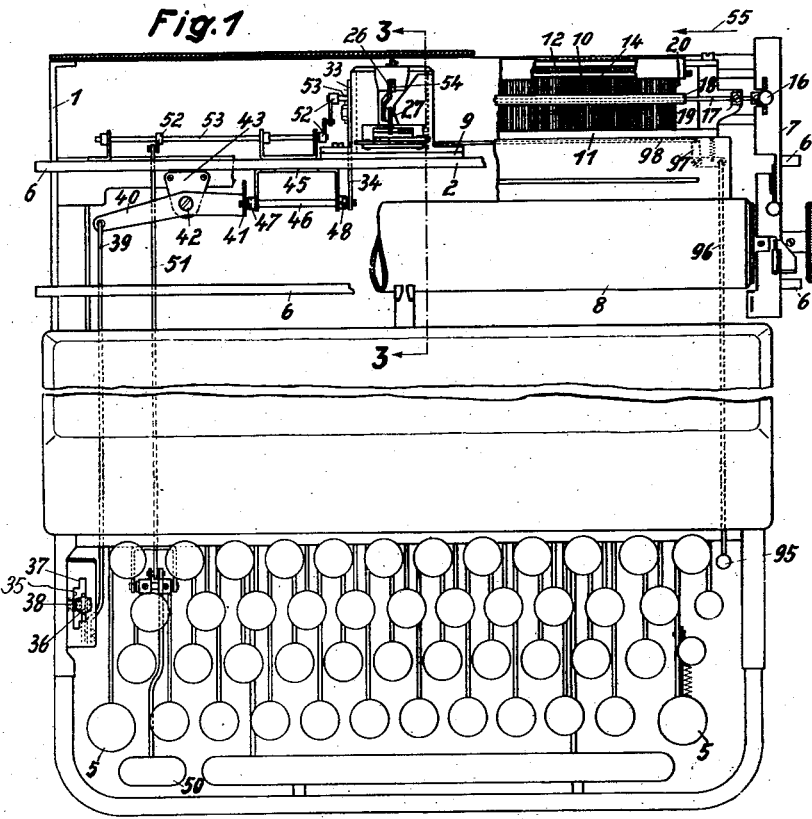
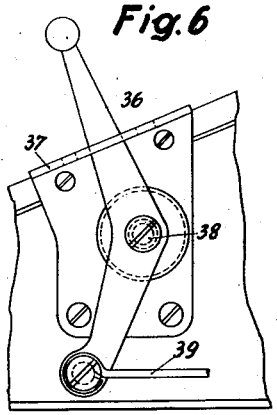
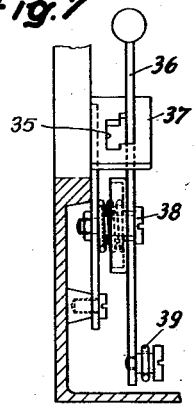
Inventor:
Hugo Schüler
By Young, Emery & Thompson
Attorneys

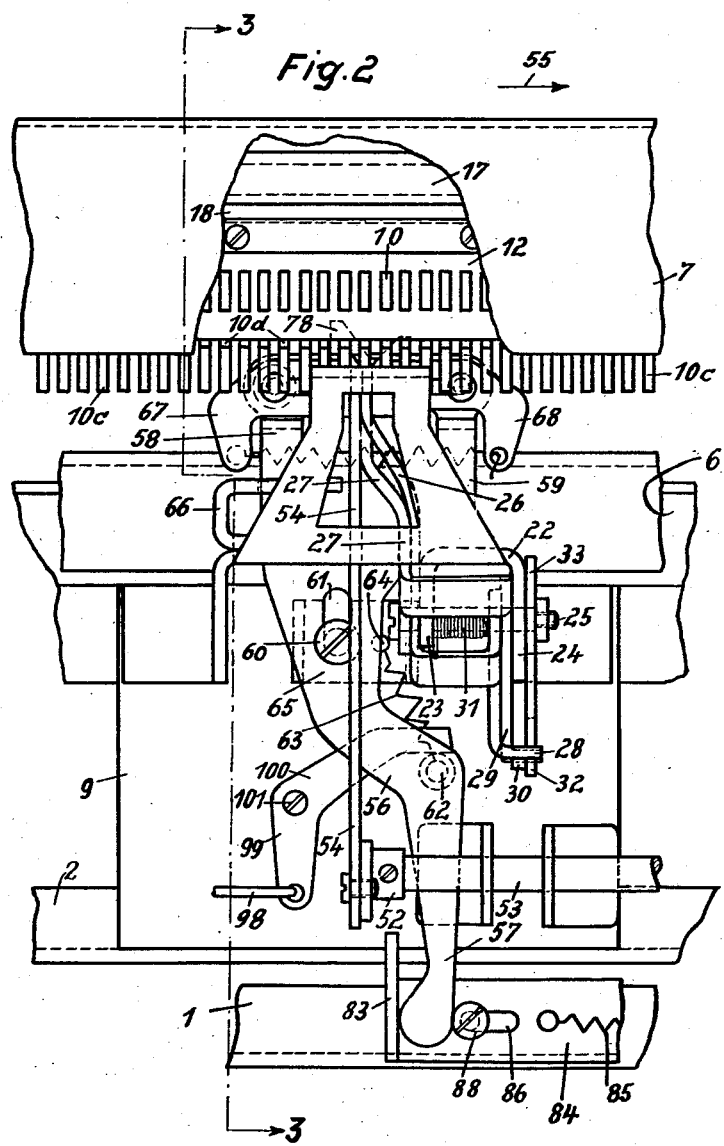

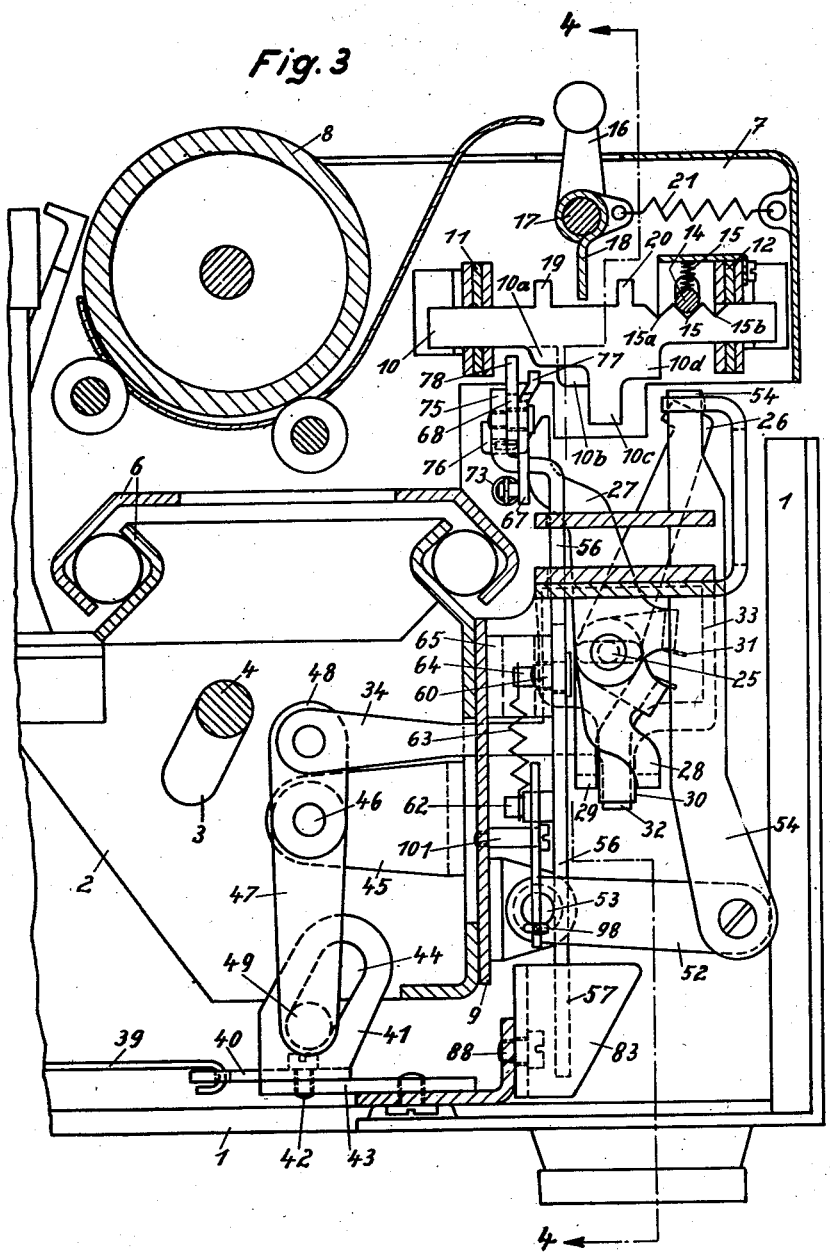

Sept. 29, 1942. H. SCHÜLER 2,297,254
TYPEWRITER AND LIKE MACHINE
Filed Aug. 23, 1938 5 Sheets-Sheet 4

Inventor:
Hugo Schüler
By Young, Emery & Thompson
Attorneys

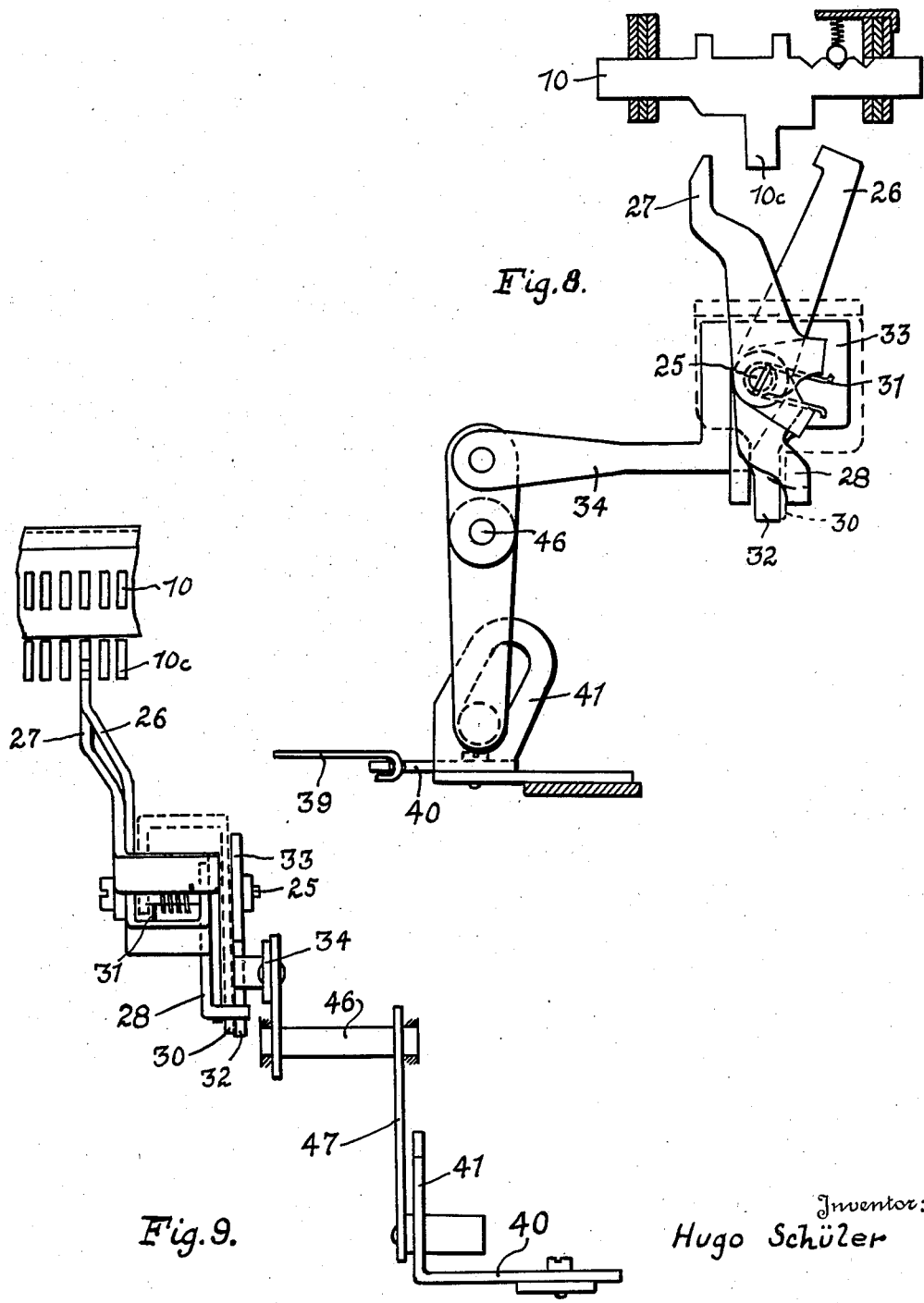

Patented Sept. 29, 1942

2,297,254

UNITED STATES PATENT OFFICE 2,297,254

TYPEWRITER AND LIKE MACHINE

Hugo Schüler, Siegmar-Schonau, Germany;
vested in the Alien Property Custodian

Application August 23, 1938, Serial No. 226,343
In Germany August 28, 1937

19 Claims. (Cl. 197—63)

This invention relates to typewriters and like machines, especially small typewriters, having a number of setting stops for setting margins and for limiting the tabulating motion of the paper carriage.

An object of the invention is to provide mechanism for setting margins and for tabulating work which is characterised by the numerous settings which can be made. Another object of the invention resides in the provision of simple and effective means for operating various setting stops to various positions. Further and other objects of the present invention will be hereinafter set forth in the accompanying specification and claims and shown in the drawings which, by way of illustration, show what I now consider to be a preferred embodiment of my invention.

The invention is exemplified by the accompanying drawings in which—

Fig. 1 is a plan partly in section of a typewriter,

Fig. 2 is a partial view of the back of the machine,

Fig. 3 is a partial section on the line 3—3 of Figs. 1 and 2.

Figs. 6 and 7 are detail views on an enlarged scale, and

Figs. 8 and 9 are side and end views respectively of certain details.

Figure 4:
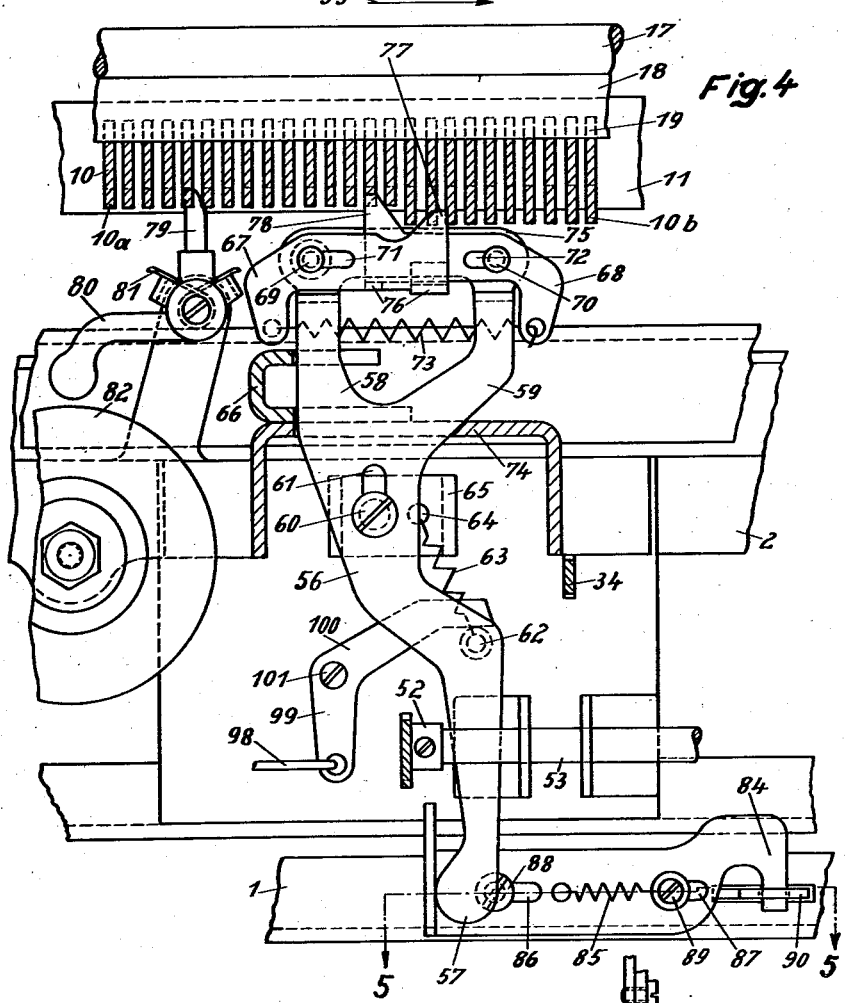
Fig. 4 is a section on the line 4—4 of Fig. 3.

All parts not necessary for exemplifying the invention are omitted from the drawings.

On the frame 1 of the typewriter the case-shift member 2 is movably mounted by a slot 3 in which engages a pin 4 on the frame 1. The shift member 2 can in a known manner be raised into a position above its normal position by depressing the shift key 5, for example for typing capital letters. The shift member 2 is provided with paper carriage guides 6 on which the paper carriage 7 carrying the platen 8 is permitted to move in a longitudinal direction. The paper carriage 7, by the usual mechanism, which is not shown in the drawings, engages by means of a rack fixed thereon a toothed wheel of a usual escapement mechanism, and is advanced stepwise in the direction of the arrow 55 during typing by the paper carriage spring, also not shown in the drawings.

On a plate 9 of the shift member 2 are mounted the parts which co-operate with setting stop riders 10 mounted on the paper carriage 7.

The riders 10, of which the various setting stop parts are indicated by 10a, 10b and 10d (Fig. 3), are slidably mounted in slots in two holding bars 11 and 12. They are held in their rest or working positions by a rod 14 acting under the pressure of a spring 13, which is engaged by a notch 15, 15a or 15b of each rider 10. All displaced riders 10 can, by means of a lever 16 which turns a bar 18 fixed on a rod 17 against the action of a spring 21, the bar 18 engaging the projections 19 and 20 of the riders 10, be restored in common from one or another of their operative positions to their mean inoperative position.

On the plate 9 of the shift member 2 is fixed a bearing block 22 on which are cheeks 23 and 24. Fixed to the cheeks 23 and 24 is a bolt 25 on which two operating members 26 and 27 are rotatably mounted. Projections 10c of the riders 10 lie in the path of motion of the free ends of the members 26 and 27. By actuation of the member 26 the rider 10 for the time being directly above it is pushed to the left (Fig. 3) a distance which is greater or smaller in dependence on the magnitude of the throw of the member 26. In this manner an individual rider 10, if in its right-hand, that is displaced, position, can be restored to its central rest position or, if in its rest position, can be pushed towards the left into another operative position. By actuating the member 27 on the other hand an individual rider can be restored to its rest position from a position displaced to the left or can be moved from its rest position into an operative position on the right.

The member 26 and its free arm 28 are the free limbs of an advantageously U-shaped lever 26, 28. In a similar manner the member 27 and its free arm 29 are the free limbs of another U-shaped lever 27, 29. The outer ends of the arms 28 and 29 are bent. The two ends of a spring 31 on the bolt 25 bear under tension against the connecting webs of the levers 26, 28 and 27, 29 so that the spring tends to turn the lever 26, 28 in the clockwise direction (Fig. 3) and the lever 27, 29 in the anti-clockwise direction, and the bent ends of the arms 28 and 29 remain in their rest position in which they bear opposite one another on a stop 30 formed on the cheek 24.

The stop 30 of the cheek 24 is almost completely covered by the arm 32 of a similarly formed slide 33. The slide 33 is provided with a guide slot which fits over the bolt 25. By movement of this slide 33 towards the right (Fig. 3) the lever 26, 28 is turned in the anti-clockwise direction and the rider 10 which, in the existing position of the paper carriage, is above the members 26 and 27 is displaced to the left. By movement of the slide 33 towards the left the lever 27, 29 is turned in the clockwise direction and the corresponding rider is thereby displaced to the right.

Movement of the slide 33 is caused by a lever and rod connection actuated by a setting lever 36 situated in the keyboard of the typewriter (Fig. 1). The setting lever 36 passes through a slot 35 in a guide plate 37 fixed to the frame 1 and having step-shaped stops. The setting lever 36, which has on its upwardly projecting end an actuating knob, is mounted on a bolt 38 fixed to the frame 1 so that it can turn and move laterally against a spring. The lower forwardly inclined end of the lever 36 is connected with a tension rod 39. The tension rod is connected at its other end with the arm 40 of a lever 40, 41 which pivots at 42 on a projection 43 fixed to the frame 1. The outer end of the arm 40 of the lever 40, 41 is bent and has a guide slot 44 which runs in the direction of the slot 3 in the shift member 2. On the shift member 2 is fixed a plummer block 45 in the cheeks of which is mounted a shaft 46. On the respective ends of the shaft 46 are mounted arms 47 and 48 which act as the arms of a lever pivoting on the shaft 46. The lever arm 47 has at its free end a pin 49 which is engaged by the slot 44 of the bent arm 41 of the double lever 40, 41. The lever arm 48 is linked with the arm 34 formed on the slide 33. The slot 44 compensates for the shift movement of the shift member 2.

Under the action of the spring 31 by which the arm 32 of the slide 33 is held behind the fixed stop 30 between the arms 28 and 29 of the levers 26, 28 and 27, 29, the tension rod and the setting lever 36 are held in the middle inoperative position (Fig. 1). If the setting lever 36 is moved forwards (Fig. 1) the lever 40, 41 is turned clockwise by the tension rod 39. The bent arm 41 of the lever 40, 41 transmits the setting motion in either position of the shift member 2 to the lever arm 47. The setting motion is then transmitted from the lever arm 47 through the shaft 46 and the lever arm 48 in the opposite direction to the slide 33, which is pushed backwards on its guide slot. The projection 32 of the slide 33 then presses the bent end of the free arm 28 of the lever 26, 28 against the action of the spring 31 and turns the lever 26, 28 in an anti-clockwise direction (Fig. 3).

If the setting lever 36 is moved to the right-hand front stop of the guide plate 37 (Fig. 1), the lever 26, 28 turns sufficiently far to restore a rider 10, which may be in its right-hand working position (Fig. 3), to its middle inoperative position. If, on the other hand, the setting lever 36 is moved to the left-hand front projection of the guide plate 37, which is further from the mean position, the lever 26, 28 executes a greater turning movement which is sufficient to move the appropriate rider 10 into its left-hand working position (Fig. 3).

If the setting lever 36 is moved to the rear left-hand stop of the guide plate 37 (Fig. 1) the rod 39 and the slide 33 move in a direction opposite to that described above. The projection 32 of the slide 33 then presses against the arm 29 of the lever 27, 29 and turns said lever far enough to restore a rider 10 displaced to the left (Fig. 3) into its mean rest position. If the setting lever 36 is moved against the right-hand rear stop (Fig. 1) of the guide plate 37, which is further from the mean position of the slide than is the left-hand rear stop, the lever 27, 29 (Fig. 3) is turned far enough to bring the rider 10 from its rest position to its right-hand working position. The setting movements of the setting lever 36 and of the rider 10 are always in the same direction.

In its right-hand working position (Fig. 3) the setting stop 10d of the rider 10 co-operates with a counter-stop 54 of the paper-carriage release apparatus (tabulator). By actuating the carriage release key 50 (tabulator key) the stop 54 is raised through the lever arm 52 and the shaft 53. At the same time the paper-carriage spacing mechanism is uncoupled in the usual manner (not shown in the drawings), for example the rack on the paper-carriage is brought out of engagement with the toothed wheel working with the escapement mechanism, so that the paper carriage 7 can be moved freely by the tension of the carriage spring. On being raised, the stop 54 comes into the path of motion of the setting stop 10d of the rider 10 displaced to the right, thus stopping the carriage at a position determined by the rider in question.

For setting the length of the lines of type (margins) the riders 10 are provided with other setting stops 10a and 10b. The riders 10 provided with stops 10b serve in the machine particularly described to limit the backward motion of the paper carriage. The riders 10 provided with stops 10a on the other hand serve to limit forward motion of the paper carriage in the direction of the arrow 55. A rider 10 is provided for each letter space of the paper carriage 7, the riders with stops 10b extending over the left-hand part, those with stops 10a extending over the right-hand part of the paper carriage 7.

As can be seen from Fig. 4 a supporting member 56 is mounted on a bolt passing through a slot 61 and fixed on a stirrup 65 which is fixed to the plate 9 of the shift member 2. The member 56 has three limbs 57, 58 and 59, of which the limbs 58 and 59 are connected with each other at their ends by a web 75. A spring 63 is fixed at one end to a pin 62 on the member 56 and at the other end to a pin 64 on the stirrup 65. The spring 63 holds the member 56 in its upper position, shown in Fig. 4, against the bolt 60 in the slot 61, and at the same time turns it counter-clockwise (Fig. 4) until the limb 58 bears on a recessed stop in a guiding fork 66. Two stop members 67 and 68 are slidably mounted at the ends of the limbs 58, 59 of the supporting member 56 by set screws 69 and 70 passing through elongated perforations 71 and 72. The ends of the stop members 67 and 68 are joined together by a spring 73. Bent parts 76 of the stop members 67 and 68 bear against the web 75 and act as guides. The stop member 67 can thus be moved to the left along the elongated hole 71 against the spring 73, or can be turned clockwise (Fig. 4) about the set screw 69. Likewise the stop member 68 can be moved to the right along the elongated hole 72 against the same spring, or can be turned anti-clockwise (Fig. 4) about the set screw 70.

The stop member 67 carries a counter stop 77 which lies in the path of motion of the stop 10b of any rider 10 which may be in operative position, and thus stops the movement of the paper carriage in the direction opposite to the arrow 55 as soon as the projection 10b of a rider 10 engages the counter stop 77 of the stop member 67 on its approximately vertical narrow edge and thereby pushes the stop member 67 to the left along the elongated hole 71 against the spring 73 as far as is permitted by the set screw 69.

Turning of the supporting member 56 anti-clockwise (Fig. 4) about the bolt 60 is not possible.

The stop member 68 is provided with a counter stop 78 which, corresponding with the projection 10a of the rider 10, reaches somewhat higher than the counter stop 77 of the stop member 67. The counter stop 78 thus lies in the path of motion of the setting stop 10a of any rider 10 which may be in operative position and thus stops the motion of the paper carriage in the direction of the arrow 55 as soon as a setting stop 10a engages the approximately vertical narrow edge of the counter stop 78. Thereby the stop member 68 is pushed to the right in the elongated hole 72 against the spring 73 as far as is permitted by the set screw 70. The whole supporting member 56 then turns clockwise (Fig. 4) about the bolt 60 against the spring 63 as far as a stop 74.

Shortly before the end of a line set by a setting stop 10a the stop 10a engages the arm 79 of a clapper 80 which, when the stop 10a has passed, is released and under the action of a spring 81 strikes a bell 82 in the usual manner, thus indicating the approaching end of the line.

Figure 5:
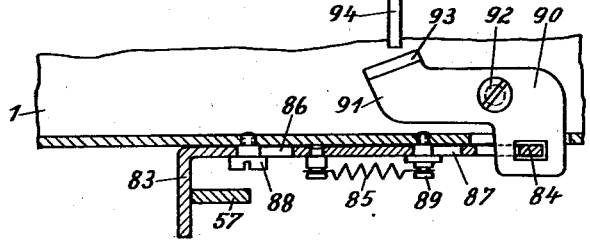
Fig. 5 is a section on the line 5—5 of Fig. 4.

When the line ends, advantageously not only is the paper carriage stopped, but the operation of the keys is also prevented. This is effected in the example shown as follows: The limb 57 of the supporting member 56 bears against the bent part 83 of a bolt 84 and moves this to the left (Figs. 4 and 5) against a spring 85. The bolt 84 can be moved longitudinally as far as permitted by set screws 88 and 89 which pass through elongated holes 86 and 87 and are fixed to the frame 1. By pushing the bolt 84 from its rest position by the above described turning of the supporting member 56 a lever 90, 91 connected with the bolt 84 is turned clockwise (Fig. 5) about the screw 92 in the frame 1. This causes a bent part 93 of the arm 91 to come into the path of motion of a part 94 which is moved when the typing keys are operated, and thus prevents impact of the type on the platen 8. The part 94 is advantageously connected with the universal bar or the rocking body of the escapement mechanism (not shown) which is moved by the operation of the typing keys and therewith of the type levers.

In the keyboard of the typewriter a knob 95 (Fig. 1) is provided which serves to release the left or right margin stop and the locking of the keys, that is the operation of the margin setting stops 10a, 10b described above. This is effected in a simple manner by moving the supporting member 56 out of its operative position. The knob 95 acts directly on a rod 96 which is linked to an arm of a bell-crank lever 97 mounted on the shift member 2. The other arm of the bell-crank lever 97 is connected by a further rod 98 (Fig. 4) with the arm 99 of a bell crank lever 99, 100, which is rotatably mounted at 101 on the plate 9 of the shift member 2. The arm 100 of the bell-crank lever 99, 100 bears on the pin 62 of the supporting member 56, to which the spring 63 is fixed. By pulling the knob 95 the lever 99, 100 is turned clockwise (Figs. 2 and 4). Thereby the supporting member 56 is moved downwards against the spring 63, until the bolt 60 strikes the upper end of the slot 61, so far that the counter stops 77 and 78 of the stop members 67 and 68 are brought downwards out of the paths of motion of the respective setting stops 10b and 10a. The counter stops 77, 78, in consequence of the spring 73, which has hitherto been held in tension by the contact of the stop 77 or 78 with the counter-stop 10b or 10a as described above, return beneath the stops 10a, 10b to their initial positions shown in Fig. 4. The pulling of the knob 95 thus permits the paper carriage 7 to be moved over the various setting stops 10a, 10b on the right or left hand side for writing on the sheet laid on the platen on either side of the set margins. By releasing the knob 95 the parts actuated by it are restored to their initial position by the spring 63 on the supporting member 56.

The paper carriage, which is limited in its movement in the direction of the arrow 55 by the margin setting effected by the stop 10a can move in the opposite direction without being stopped by any stop 10a which may be in the operative position. This is attained by providing the counter stop 78 of the stop member 68 with an inclined rear edge opposite the approximately vertical stopping edge. When the paper carriage and therewith the setting stop 10a move in the direction of the arrow 55 the stop 10a can slide over the inclined rear edge of the counter stop 78, as the stop member 68 carrying the counter stop 78, can turn anti-clockwise (Fig. 4) against the spring 73. Likewise the paper carriage 7, though stopped in its motion contrary to the arrow 55 by a set stop 10b, can move in the opposite direction without hindrance from the set stop 10b, since then the stop member 67 carrying the counter stop 77 is turned clockwise by the set stop 10b about its bearing pin 69 against the spring 73 and thus offers no resistance.

While I believe the above described embodiments of my invention to be preferred embodiments, I wish it to be understood that I do not desire to be limited to the exact details of process, design and construction shown and described, for obvious modifications will occur to a person skilled in the art.

Variations may be resorted to within the scope of the invention, and portions of the improvements may be used without others.

What I claim is:

1. A typewriter or like machine comprising a paper carriage, a frame in which said carriage travels, a plurality of riders on said carriage each settable from a mid-position to end-positions on either side thereof in one of which end-positions the rider acts as a tabulator stop and in the other of which end-positions the rider acts as a margin stop, a pair of associated means operative to selectively contact and set and restore the riders, each means of said pair of means being operative to set a rider from its mid-position to one end-position and restore it from the opposite end-position to mid-position respectively, a single manually operable member for selectively actuating said pair of associated means, connections between said member and said pair of associated means for transmitting both setting and restoring movements thereto, and stop means on the frame cooperating with said riders.

2. A typewriter or like machine comprising a paper carriage, a frame in which said carriage travels, a plurality of riders on said carriage each settable from a mid-position to end-positions on either side thereof in one of which end-positions the rider acts as a tabulator stop and in the other of which end-positions the rider acts as a margin stop, a pair of associated means operative to selectively contact and set and restore the riders, said pair of means being selectively actuable through different amplitudes, each means of said pair of means being operative to set a rider from its mid-position to one end-position and restore it from the opposite end-position to mid-position respectively according to the amplitude of movement of said means, a single manually operable member for selectively actuating said pair of associated means through different amplitudes, connections between said member and said pair of associated means for transmitting both setting and restoring movements thereto, and stop means on the frame cooperating with said riders.

3. A typewriter or like machine comprising a paper carriage, a frame in which said carriage travels, a plurality of riders on said carriage each settable from a mid-position to end-positions on either side thereof in one of which end-positions the rider acts as a tabulator stop and in the other of which end-positions the rider acts as a margin stop, a pair of associated means operative to selectively contact and set and restore the riders, each means of said pair of means being operative to set a rider from its mid-position to one end-position and restore it from the opposite end-position to mid-position respectively, a single manually operable member for selectively actuating said pair of associated means, connections between said single manually operable member and said pair of associated means for transmitting both setting and restoring movements thereto, and stop means on the frame cooperating with said riders, said riders each having a plurality of lugs one operating as a tabulator stop, one as a margin stop, and a third lug cooperating with the rider setting and restoring means.

4. A typewriter or like machine comprising a paper carriage, a frame in which said carriage travels, a plurality of riders on said carriage each settable from a mid-position to end-positions on either side thereof in one of which end-positions the rider acts as a tabulator stop and in the other of which end-positions the rider acts as a margin stop, a pair of associated means operative to selectively contact and set and restore the riders, each means of said pair of means being operative to set a rider from its mid-position to one end-position and restore it from the opposite end position to mid-position respectively, said means of the pair of means acting on the riders in opposite directions, a spring operative on both means of said pair to urge them to a rest position and resist such opposing actions, a single manually operable member for selectively actuating said pair of associated means, connections between said single manually operable member and said pair of associated means for transmitting both setting and restoring movements thereto, and stop means on the frame cooperating with said riders.

5. A machine according to claim 3 in which the frame stop means comprise a stop-carrying member mounted in the machine frame adjacent the path of the paper carriage, a stop on said member cooperating with at least one of the margin stop lugs of the riders in the right-hand half of the carriage, and another stop on said member cooperating with at least one of the margin stop lugs of the riders on the left-hand half of the paper carriage, said member being mounted for movement to a position in which the stops thereon are ineffective to cooperate with their respective margin stop lugs.

6. A machine according to claim 3 in which the frame stop means comprise a stop-carrying member mounted in the machine frame adjacent the path of the paper carriage, a stop on said member cooperating with at least one of the margin stop lugs of the riders in the right-hand half of the carriage, and another stop on said member and cooperating with at least one of the margin stop lugs of the riders on the left-hand half of the paper carriage, said margin stop lugs on the right hand half of the carriage having their lowermost part in a different horizontal plane from that in which the lowermost parts of the margin stop lugs of the left hand half of the carriage are arranged, said stops being slidable relatively to the stop-carrying member, so that after meeting of one of said stops and a set margin stop lug the carriage may still travel a few letter spaces before it is completely arrested, said stops having their rider engaging parts lying at different levels with respect to the riders corresponding to the arrangement of the margin stop lugs on the riders.

7. A typewriter or like machine comprising a paper carriage, means for moving the paper carriage step by step as the typewriter operates, a plurality of riders on said carriage settable from a mid-position to end-positions on either side thereof in one of which end-positions the rider acts as a tabulator stop and in the other of which end-positions the rider acts as a margin stop, a pair of associated means operative to selectively contact and set and restore the riders, each means of said pair of means being operative to set a rider from its mid-position to one end-position and restore it from the opposite end-position to mid-position respectively, a single manually operable member for selectively actuating said pair of associated means, for connections between said single manually operable member and said pair of associated means for transmitting both setting and restoring movements thereto, a stop-carrying member pivotally mounted in the machine frame adjacent the path of the carriage, a stop on said member cooperating with riders on one side of the center of the paper carriage, another stop on said member cooperating with riders on the other side of the center of the paper carriage, and a locking arm operated by the pivotal movement of said stop-carrying member to block operation of the paper carriage moving means.

8. A typewriter or like machine comprising a paper carriage, means for moving the paper carriage step by step as the typewriter operates, a plurality of riders on said carriage settable from a mid-position to end-positions on either side thereof in one of which end-positions the rider acts as a tabulator stop and in the other of which end-positions the rider acts as a margin stop, a pair of associated means operative to selectively contact and set and restore the riders, each means of said pair of means being operative to set a rider from its mid-position to one end-position and restore it from the opposite end-position to mid-position respectively, a single manually operable member for selectively actuating said pair of associated means, connections between said single manually operable member and said pair of associated means for transmitting both setting and restoring movements thereto, a stop-carrying member slidably mounted in the machine frame adjacent the path of the carriage, a stop on said member cooperating with riders on one side of the center of the paper carriage, another stop on said member cooperating with riders on the other side of the center of the paper carriage, and manually operable means for slidably moving the stop-carrying member to bring said stops out of the path traversed by the riders in movement of the paper carriage.

9. A typewriter or like machine comprising a paper carriage, a frame in which said carriage travels, stops mounted in the frame, a plurality of riders each having a tabulator stop lug and a margin stop lug, said riders being settable in said carriage in opposite directions from a central ineffective position into two effective positions to place said stop lugs in and out of cooperation with said frame stops, a manually operable rider setting member, a pair of rider actuating means operative upon the riders individually in accordance with the position of the paper carriage, said pair of actuating means being movable in opposite directions to each other to set a rider into a desired position, and connections between said setting member and said actuating means.

10. A typewriter or like machine comprising a paper carriage, a frame in which said carriage travels, stops mounted in the frame, a plurality of riders each having a tabulator stop lug and a margin stop lug, said riders being settable in said carriage from a mid-position in which neither stop lug is effective to end positions on each side of said mid-position in which end positions said margin and tabulator stop lugs are respectively effective to cooperate with said frame stops, a single manually operable rider setting member, a pair of rider actuating means to operate and set any one of the riders in accordance with the position of the paper carriage, said pair of actuating means being selectively movable in opposite directions through different amplitudes by operation of said manually operable setting member, to set said rider from its ineffective mid-position to one effective end-position and restore it from one end-position to ineffective mid-position and to set it to the opposite end-position respectively, rider restoring means operative in either direction simultaneously on a plurality of said riders, and lugs on the riders cooperating with said restoring means, said lugs being so arranged that movement of said restoring means in one direction restores to mid-position riders set in one effective position whereof tabulating stop lugs were effective while movement of said restoring means in the other direction restores to mid-position riders set in the other effective position whereof margin stop lugs were effective.

11. A typewriter or like machine comprising a paper carriage, a frame in which said carriage travels, stop members mounted in said frame, a plurality of riders movable with the paper carriage, each rider being settable in opposite directions from a central ineffective position into two effective positions, each rider having a margin stop lug for cooperation with one of said frame stop members and a tabulator lug for cooperation with another of said frame stop members, a single manually operable rider setting member, two rider actuating members supported against movement in the direction of travel of the paper carriage but movable in mutually opposite directions transversely thereto, and connections between the setting member and said rider actuating members for transmitting the operation movement from said setting member to said rider actuating members.

12. A typewriter or like machine comprising a paper carriage, a frame in which said carriage travels, stop members mounted in said frame, a plurality of riders movable with the paper carriage, each rider being settable in opposite directions from a central ineffective position into two effective positions, each rider having a margin stop lug for cooperation with one of said frame stop members and a tabulator stop lug for cooperation with another of said frame stop members, a single manually operable rider setting member, two rider actuating members supported against movement in the direction of travel of the paper carriage and movable in mutually opposite directions transversely thereto, connections between the setting member and said rider-actuating members for transmitting the operation movement from said setting member to said rider actuating members, and a release member operable in two directions to restore the stop lugs of all set riders into a normal inoperative position.

13. A typewriter or like machine comprising a paper carriage, a frame in which said carriage operates, stops mounted in said frame, a plurality of riders movable with the paper carriage and each carrying a tabulator stop lug and a margin stop lug settable in opposite directions from a central ineffective position into positions for cooperation with the respective frame stops, each rider being movable by various amounts for setting it from one end-position to the other end-position and from mid-position to one end-position and back again respectively, a single manually operable rider setting member, and two rider-actuating members supported against movement in the direction of travel of the paper carriage and movable in mutually opposite directions transversely thereto by various amounts by operation of the setting member whereby said actuating members correspondingly move a rider which is in cooperation therewith.

14. A typewriter according to claim 11 in which the rider setting member is a lever pivoted for shifting in different directions and guided in such movements by a member having step-shaped stops to indicate the positions of the rider stop lugs according to the positions of said lever in the guide member.

15. A machine according to claim 11 in which the rider setting member is movable from an ineffective position into four positons for operating said rider-actuating members, two of which positions are provided for setting and resetting the one stop lug of the rider into and out of cooperation with the corresponding frame stop and the other two of which positions are provided for setting and resetting the other stop lug of said rider into and out of cooperation with the other frame stop.

16. A typewriter or like machine according to claim 11 in which the frame stops for limiting the margin are mounted on supporting means slidably and pivotally mounted in the frame, and an actuating member is operatively connected with the last-mentioned means to effect its sliding movement, said movement being in a direction to shift the margin-limiting frame stops out of the path of the margin stop lugs of the riders, and in which is provided a lock member on a movable part of the machine arrest of which will prevent typing, and means movable into engagement with said lock member by the pivotal movement of the supporting means, said pivotal movement resulting from engagement of a margin stop lug against the opposed side of a margin-limiting frame stop.

17. A typewriter or like machine according to claim 11 in which the frame stops for limiting the margin are mounted on supporting means slidably and pivotally mounted in the frame, and an actuating member is operatively connected with said supporting means to effect its sliding movement, said movement being in a direction to shift the margin-limiting frame stops out of the path of the margin stop lugs of the riders and in which is provided a lock member on a movable part of the machine arrest of which will prevent typing, and means movable into engagement with said lock member by the pivotal movement of the supporting member, said pivotal movement resulting from engagement of a margin stop lug against the front side of a margin-limiting frame stop, a spring being also provided which normally holds said margin-limiting frame stops in operative positions but permits them to yield when struck by the margin stop lugs during movement of the paper carriage and riders in the direction towards the back of said margin-limiting frame stops.

18. A typewriter or like machine comprising a paper carriage, a frame in which said carriage travels, a plurality of riders on said carriage each settable from a mid-position to end-positions on either side thereof in one of which end-positions the rider acts as a tabulator stop and in the other of which end-positions the rider acts as a margin stop, a pair of associated means operative to set and restore the riders, each means of said pair of means being operative to set a rider from its mid-position to one end-position and restore it from the opposite end-position to mid-position respectively, a single manually operable member for selectively actuating said pair of associated means, said member being located in the front of the machine, connections between said member and said pair of associated means for transmitting both setting and restoring movements thereto, and stop means on the frame cooperating with said riders.

19. A typewriter or like machine comprising a paper carriage, means for moving the paper carriage step by step as the typewriter operates, a plurality of riders on said carriage settable from a mid-position to end-positions on either side thereof in one of which end-positions the rider acts as a tabulator stop and in the other of which end-positions the rider acts as a margin stop, a pair of associated means operative to set and restore the riders, each means of said pair of means being operative to set a rider from its mid-position to one end-position and restore it from the opposite end-position to mid-position respectively, a single manually operable member for selectively actuating said pair of associated means, connections between said member and said pair of associated means for transmitting both setting and restoring movements thereto, a stop-carrying member slidably and pivotally mounted in the machine adjacent the path of the carriage, a stop on said stop-carrying member cooperating with riders on one side of the paper carriage, another stop on said stop-carrying member cooperating with riders on the other side of the paper carriage, manually operable means for slidably moving the stop-carrying member to bring said stops out of the path traversed by the riders on movement of the paper carriage, and a locking arm operative by the pivotal movement of the stop-carrying member to block operation of the paper carriage moving means.

HUGO SCHÜLER.